3,560,155
GRAPHITE PRODUCT
Franciszek Olstowski, Freeport, Tex., and Kenneth W. Guebert, Midland, Mich., assignors to The Dow Chemical Company, Midland, Mich.
No Drawing. Original application Mar. 30, 1966, Ser. No. 538,589, now Patent No. 3,448,181, dated June 3, 1969. Divided and this application Nov. 5, 1968, Ser. No. 810,413
Int. Cl. C01b 31/04
U.S. Cl. 23—209.2    1 Claim

ABSTRACT OF THE DISCLOSURE

This invention is a new form of graphite flake. Such flakes are irregular in form, have a density of between 0.25 and 1.5 gm./cc. and are prepared by compressing individual particles of vermicular expanded graphite to the desired density. Masses of these flakes may be compressed to form cohered articles without the need of a binder.

This application is a division of application Ser. No. 538,589 filed Mar. 30, 1966, now issued as U.S. 3,448,181.

This invention relates to a process for producing compressed graphite structures from particulate vermicular graphite and more particularly relates to an improved process for producing relatively dense graphite structures from relatively low density vermicular graphite requiring a minimum of volume change by mechanical compression.

It is known that expanded graphite in vermicular form is compressible and masses of such vermicular graphite may be formed into shaped structures approaching the theoretical density of the graphite. It is likewise known, however, that in compressing masses of vermicular graphite such large volume changes are usually necessary that serious mechanical difficulties are encountered, particularly in the formation of relatively high density structures.

It is an object of this invention to provide an improved process for producing cohered graphite structures from vermicular graphite. Another object is to provide a process for compressing such vermicular graphite wherein the volume change during such compression is minimized. These and other objects and advantages of the present process will become apparent from a reading of the following detailed description.

It has now been discovered that relatively high density graphite structures may be produced by first compressing the particulate vermicular graphite particles individually or in small groups, clusters or clumps into flattened flakes, then compressing the necessary quantity of such compressed graphite particles into the desired shaped structure. It has been found that coherence and interlocking between such flakes, when compressed as a random mass, is sufficient to produce a cohered, integral, monolithic structure having good structural strength. By compressing the individual particles or small clumps of particles, a mass of flattened, irregularly-shaped, flake-like particles (herein referred to as "compressed flakes") are produced whose bulk density is comparatively high in relation to the vermicular form prior to compression. Only a minimum volume change is required, therefore, to compress a mass of such flattened particles into a relatively high density structure. A structure prepared from such compressed flakes is usually physically indistinguishable from one compressed directly from vermicular graphite and has substantially the same electrical and thermal characteristics.

The vermicular graphite employed herein is a compressible form of graphite prepared by introducing an intercalating agent between the laminae of natural or synthetic graphite and expanding such treated graphite by heating to a temperature above about 200° C., and usually above 500° C. For example, a heat-expandable graphite may be prepared by contacting graphite particles with an intercalating agent such as fuming nitric acid, fuming sulfuric acid, mixtures of concentrated nitric and sulfuric acids, perhaloacids or the like. The treated graphite particles may then be washed free of excess intercalating agent and dried if desired. The resulting treated graphite may be expanded in volume from about 20 to about 600 times by heat, e.g., with a propane flame. Such expanded vermicular graphite is usually in light weight, particulate, worm-like form and is easily malleable and compressible into shaped monolithic structures.

Compression of such expanded vermicular graphite along a single axis produces a compact integral structure having high electrical and thermal anisotropy. Both electrical and thermal resistivity are highest in the direction of compression and lowest in the direction perpendicular to that of compression. The anisotropy ratio of such compressed structures increases with increasing compression up to or near the theoretical density of the graphite. Compression of vermicular graphite in two directions substantially reduces the anisotropic properties of the compressed structure and isostatic compression produces a structure having little or no anisotropy.

In the first step of this process, vermicular graphite particles or clumps of particles are compressed to form very thin, flattened, lacy, irregular, flake-like, separate particles having many times the diameter of the original particle or clump of particles and having high diameter to thickness ratios. Such compression may be accomplished by any conventional means such as passing vermicular graphite particles between rollers, pressing between flat platens and the like but passing such particles between rollers is usually the most rapid and efficient means.

Vermicular graphite, suitable for compression into strong unitary compacts, has an apparent bulk density of between about 0.002 to about 0.02 gm./cc. For use in the process of this invention, it is desirable that such graphite be formed into compressed flakes having a particle density in the range of from about 0.25 gm./cc. to about 1.5 gm./cc. and an apparent bulk density of from about 0.03 to about 0.2 gm./cc. The density of such compressed graphite flakes is easily controlled by varying the force and, to some extent, the time of compression. If rollers are used to form such flakes from the vermicular graphite, the density of the compressed flake is easily controlled by controlling the gap between the rollers and their speed of rotation. A larger gap between the rollers and high roller speed produces lower density flakes whereas a smaller roller gap and lower roller speed produces flakes having a higher particle density. The density of such flakes may be further increased by passage through through more than one set of rollers or by multiple passes through the same rollers.

Once the vermicular graphite has been compressed to form thin flexible compressed graphite flakes of the desired density, a random mass of such flakes is compressed to form a shaped structure. Compression of a mass of such flakes along a single axis will produce a compact or structure similar to one produced directly from the vermicular graphite, i.e. one having high electrical and thermal anisotropy. Both electrical and thermal resistivity are highest in the direction of compression and lowest in the direction perpendicular to that of compression. The anisotropy ratio of such structure increases with increasing compression up to or near the theoretical density of the graphite. Compression from two directions substantially reduces the anisotropic properties of the compressed structure and isostatic compression produces a structure having little or no anisotropy. By selective compression, therefore, shaped structures may be produced from compressed graphite flakes which have a density between about 1.0 and 2.1 gm./cc. and an anisotropy ratio from almost 1 up to about 150:1. Surprisingly, the production of such structures from compressed flakes produces a product of comparable properties to that obtained by compressing vermicular graphite, yet requires a volume decrease of only about 5:1 to 70:1 to obtain a compact having a density of about 2.0 gm./cc. as compared to a volume decrease of from about 100:1 to 1000:1 for direct compression of the vermicular graphite to a structure of the same density.

Formation of an integral, monolithic structure from compressed graphite flakes usually requires a pressure of at least 300 p.s.i. to provide good bonding and a density of about 1.0. As the force of compression increases, the density of the final structure increases. Pressures above about 50,000 p.s.i. continue to increase the density of the structure but ever increasing proportions of force must be exerted to produce incremental increases in density. The application of a compressive force of between about 300 p.s.i. and 50,000 p.s.i. are therefore usually preferred.

High density structures having improved mechanical properties may be prepared in accordance with this invention by blending the compressed flakes with a solid organic or inorganic bonding agent prior to compression to form the cohered structure. Ordinarily, the organic or inorganic bonding agent is employed in the form of a fine powder, e.g. from 100 to 325 mesh, in an amount of from about 2 to about 55 weight percent and preferably from about 5 to about 45 weight percent bonding agent based on the total weight of the mixture. Bonding agents useful herein include solid organic polymers, other organic compounds which upon pyrolysis, yield a cementing char, inorganic glass-like bonding agents, and the like.

Examples of organic polymers suitable for use herein include polyethylene, acrylic and methacrylic polymers, polystyrene, epoxides, phenol-formaldehydes, polyamides, polyesters, polyvinyl chlorides, polycarbonates, polytetrafluoroethylene, polyvinylidene fluoride, polyurethanes, copolymers and blends of the same, and the like. These bonding agents can be used along with any required catalyst or crosslinker.

Examples of such other organic char yielding substances suitable for use herein include coal tar pitches, natural asphalts, phenol-formaldehyde, urea-formaldehyde, polyvinylidene chloride, and copolymers containing polyvinylidene chloride, polymers or furfuryl alcohol, polyacrylonitrile, sugars, saccharides and the like.

Examples of inorganic glass bonding agents suitable for use herein are vitreous materials which include, glass-forming oxides such as boric oxide, silica, phosphorous pentoxide, germanium oxides, vanadium pentoxide, and the like or other inorganic salts that can be obtained as glasses such as beryllium fluoride, and certain sulfates, chlorides and carbonates. Especially useful in this invention are those glass-formers which will "wet" the graphite, such as $B_2O_3$, $P_2O_5$, or $V_2O_5$. Commercially available glasses also are suitable as bonding agents. Typical examples of such glasses are compositions containing as an ingredient various proportions of two or more of the following oxides: silica, aluminum oxide, sodium oxide, potassium oxide, magnesium oxide, cuprous oxide, barium oxide, lead oxide, or boric oxide.

Glass-forming oxides are defined as those oxides which are indispensable to the formation of oxide glasses. Those skilled in the art of glass-making will readily recognize that the above named oxides are generally employed in combination with other materials to obtain glass.

The following examples are intended to further illustrate the invention but are not to be constructed as limiting to its scope.

EXAMPLE 1

Vermicular graphite having a bulk density of about 0.004 gm./cc. was placed as individual particles and as small clumps of particles on a moving belt passing between two 6 inch diameter rollers, said belt having a clearance of about 0.001 inch. The particles were passed between the rollers two to three times at a linear speed of about 5 feet/minute and produced flattened, irregular, lacy flakes ranging from about one-half inch to several inches in length and having thicknesses ranging from about 0.001 to about 0.005 inch. Such flakes had a particle density of about 0.5 to about 1 gm./cc. as determined by immersion in liquids. The bulk density of a lightly tamped volume of such flakes was about 2.3 lbs./ft.$^3$ (0.037 gm./cc.) showing a densification of about 10-fold over the original vermicular graphite.

A 9 gram sample of such compressed flakes were placed in a 4⅝" x 1¼" x 4" mold and uniaxially compressed under a force of 17,000 p.s.i. along the 4" axis during a one minute compression cycle. The product of such compression was a flexible sheet having a thickness of 0.05 inch, a density of 1.73 gm./cc., an ultimate tensile strength of 1385 p.s.i. and a specific resistance (in the plane of the sheet) of 152 microhm-inches.

In comparison, a 9.2 gram charge of vermicular graphite 36 inches high in a mold measuring 4⅝" x 1¼" was pressed to a height of 4 inches and then compressed uniaxially in the same mold under a force of 17,000 p.s.i. during a one minute compression cycle. The compressed product was a sheet having a thickness of 0.065 inch, a density of 1.49 gm./cc., an ultimate tensile strength of 644 p.s.i. and a specific resistance (in the plane of the sheet) of 220 microhm-inches.

EXAMPLE 2

In the same manner as Example 1, vermicular graphite having a bulk density of about 0.25 lbs./ft.$^3$ (0.004 gm./cc.) was placed as individual particles and as small clumps of particles on a moving belt passing between rollers. The compressed product was a collection of flattened, irregular, lacy flakes having a thickness to length ratio of from about 60:1 to about 500:1 and having a bulk density (if lightly tamped) of about 2.2 lbs./ft.$^3$ (0.036 gm./cc.). This material could be easily tamped to a density of 6 lbs./ft.$^3$ and "refluffed" to its original density and characteristics by stirring.

A mold 4 inches tall was filled with such flakes and a pressure of 17,000 p.s.i. was applied thereto during a compression cycle of 30 seconds by single stroke of a piston. The resulting compressed structure had a density of 1.63 gm./cc. and a thickness of about 0.053 inch.

In comparison, a mold having the same cross section and 24 inches high was filled with vermicular graphite having a density of 0.004 gm./cc. and compressed to a density of 0.085 gm./cc. This low density compact was then inserted into the 4 inch mold employed above and compressed under a force of 17,000 p.s.i. applied by the single stroke of a piston during a 30 second compression cycle. The resulting compressed structure was spongy, had a thickness of 0.076 inch and had a bulk density of 1.12 gm./cc.

EXAMPLE 3

In the same manner as Example 1, particles and clumps of particles of vermicular graphite having a bulk density of 0.004 gm./cc. was passed between rollers. The resulting irregular flakes had a bulk density (lightly tamped) of about 0.036 gm./cc. Upon uniaxial compression of a random mass of such flakes, a compressed structure was produced which had a density of 1.77 gm./cc., a specific resistance in the plane perpendicular to the axis of compression of 170 microhm-inches, a specific resistance in the plane parallel to the compression axis of 19,500 microhm-inches and a tensile strength of 1075 p.s.i. in the direction perpendicular to that of compression.

EXAMPLE 4

In the same manner as Example 1, compressed flakes having a density of about 0.036 gm./cc. were produced by compressing particles of vermicular graphite. A mass of such particles were placed in a rubber bag and the bag was evacuated to remove the air therefrom. After evacuation, the bag was sealed and isostatically compressed under a force of 50,000 p.s.i. The product was a cohered monolithic graphite structure having a density of 1.94 gm./cc.

Various modifications can be made in the present invention without departing from the spirit or scope thereof for it is understood that we limit ourselves only as defined in the appended claim.

We claim:
1. A product consisting essentially of separate, thin, flexible irregularly shaped graphite flakes having a density of from about 0.25 to about 1.5 gm./cc. and prepared by compressing vermicular graphite particles to said density.

References Cited

UNITED STATES PATENTS

| | | | |
|---|---|---|---|
| 1,137,373 | 4/1915 | Alysworth | 23—209.1X |
| 1,191,383 | 7/1916 | Alysworth | 23—209.1X |
| 3,431,970 | 3/1969 | Olstowski et al. | 23—209.1X |

EDWARD J. MEROS, Primary Examiner